(12) United States Patent
Kim et al.

(10) Patent No.: US 9,845,014 B2
(45) Date of Patent: Dec. 19, 2017

(54) CONTROL METHOD FOR HYDROGEN LEAK DETERMINING SYSTEM OF FUEL CELL VEHICLE

(71) Applicants: Hyundai Motor Company, Seoul (KR); Kia Motors Corporation, Seoul (KR)

(72) Inventors: Sang Hyun Kim, Gyeonggi-do (KR); Ji Hyun Shim, Seoul (KR); Ki Ho Hwang, Seoul (KR); Hyung Ki Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/935,386

(22) Filed: Nov. 7, 2015

(65) Prior Publication Data

US 2016/0171797 A1    Jun. 16, 2016

(30) Foreign Application Priority Data

Dec. 12, 2014  (KR) .................. 10-2014-0178910

(51) Int. Cl.
   *B60L 3/04*  (2006.01)
   *B60W 50/02* (2012.01)

(52) U.S. Cl.
   CPC .............. *B60L 3/04* (2013.01); *B60W 50/02* (2013.01); *Y02E 60/34* (2013.01); *Y02T 10/7005* (2013.01)

(58) Field of Classification Search
   CPC ........ G07C 5/0808; G07C 5/0825; B60L 3/04
   See application file for complete search history.

(56) References Cited

U.S. PATENT DOCUMENTS

| | | | |
|---|---|---|---|
| 2002/0023834 A1* | 2/2002 | Moulthrop, Jr. ........ | C25B 15/00 204/230.5 |
| 2005/0099275 A1* | 5/2005 | Kamdar .............. | B60R 25/2009 340/426.18 |
| 2009/0317692 A1* | 12/2009 | Matsumoto ............ | B60K 11/06 429/415 |
| 2014/0350760 A1* | 11/2014 | Takada .................. | B60L 3/0053 701/22 |

(Continued)

FOREIGN PATENT DOCUMENTS

| | | |
|---|---|---|
| JP | 2004-004013 A | 1/2004 |
| JP | 2004-023874 A | 1/2004 |
| JP | 2005-223535 A | 8/2005 |

(Continued)

*Primary Examiner* — Yonel Beaulieu
*Assistant Examiner* — Martin Weeks
(74) *Attorney, Agent, or Firm* — Mintz Levin Cohn Ferris Glovsky and Popeo, P.C.; Peter F. Corless

(57) ABSTRACT

A system control method is provided for measuring a distance between a smart key and a vehicle. When the distance between the smart key and the vehicle is changed based on a predetermined distance whether a hydrogen leak occurs is detected by a hydrogen sensor detection controller. A driver is then informed of a hydrogen leak via a display on a cluster, a turn-on of an emergency light, and a warning sound of the vehicle. Alternatively, a starting-impossible state of the vehicle or shutting-down starting of the vehicle is maintained to ensure safety measures based on the concentration of the leaking hydrogen.

9 Claims, 6 Drawing Sheets

(56) References Cited

U.S. PATENT DOCUMENTS

2015/0247818 A1\* 9/2015 Silvester ............ G01N 27/4045
205/793

FOREIGN PATENT DOCUMENTS

| JP | 4038551 B1 | 1/2008 |
|---|---|---|
| JP | 2010-030418 A | 2/2010 |
| JP | 2010-121380 A | 6/2010 |
| KR | 10-20140083739 | 4/2014 |

\* cited by examiner

CONTROL METHOD FOR HYDROGEN LEAK DETERMINING SYSTEM OF FUEL CELL VEHICLE

CROSS-REFERENCE TO RELATED APPLICATION

This application claims under 35 U.S.C. §119(a) the benefit of Korean Patent Application No. 10-2014-0178910 filed on Dec. 12, 2014, the entire contents of which are incorporated herein by reference.

BACKGROUND (a) Technical Field

The present disclosure relates to a control method for a hydrogen leak determining system of a fuel cell vehicle, and more particularly, to a control method of determining a hydrogen leak by measuring a distance of a fuel cell vehicle using a smart key and controlling detection of a hydrogen sensor based on a difference between the measured distance and a set distance between the vehicle and the smart key.

(b) Background Art

In general, a fuel cell system for a fuel cell vehicle is divided into an air process system (APS), a fuel process system (FPS), a thermal management system (TMS), and a vent system. The air process system supplies air (oxygen) to react with hydrogen to a fuel cell stack and the fuel process system supplies hydrogen to the fuel cell stack. Meanwhile, the thermal management system maintains heat generated from the fuel cell stack during a reaction at an appropriate temperature and maintains water balance required throughout the whole system, and the vent system discharges air, hydrogen, and water which participate in the reaction in the fuel cell stack.

Such a fuel cell system produces power required for driving a vehicle by a chemical reaction of hydrogen and oxygen that are stored in the fuel cell system. In particular, the hydrogen used as a fuel is a colorless, tasteless, and odorless gas that is highly explosive, and thus has a property that may cause ignition even due to minute static electricity. Accordingly, the detection of a hydrogen leak in the fuel cell vehicle is important. To detect the hydrogen leak, according to the related art, a hydrogen sensor is installed within a vehicle and a system for controlling the hydrogen sensor (e.g., a hydrogen leak determining system) is installed. Thus, the hydrogen sensors are mainly installed in a hydrogen line unit, a hydrogen tank, a fuel cell stack, and the like and determine a hydrogen leak, and when a hydrogen leak is detected, safety measures are taken based on a concentration of leaking hydrogen.

However, when starting of the vehicle stops, power is not applied to the hydrogen sensor, causing difficult in detection of a hydrogen leak, and when a hydrogen leak occurs, for safety's sake, there is a need for a control method which may determine whether a hydrogen leak occurs at a predetermined distance or greater from the vehicle.

The related art discloses a control method of actuating a gas leak monitoring unit at a predetermined time interval after the starting of the vehicle stops. However, the related art does not provide a configuration for discharging leaking hydrogen and also requires a distance from the vehicle to be below a predetermined distance to determine the hydrogen leak.

The above information disclosed in this section is merely for enhancement of understanding of the background of the invention and therefore it may contain information that does not form the prior art that is already known in this country to a person of ordinary skill in the art.

SUMMARY

The present invention provides a control method for a hydrogen leak determining system which measures a distance between a smart key and a vehicle, when the distance between the smart key and the vehicle approaches or exceeds a preset distance, detects whether a hydrogen leak occurs by a hydrogen sensor detection controller, and displays the hydrogen leak to a driver.

In one aspect, the present invention provides a control method for a hydrogen leak determining system of a fuel cell vehicle which may include a plurality of hydrogen sensors disposed within the vehicle and configured to detect a hydrogen leak, and a controller configured to receive a hydrogen concentration measured by the hydrogen sensor and measure a distance between the vehicle and a smart key, the control method may include: determining whether the distance between the smart key and the vehicle exceeds or approaches a first set value; executing detection of the hydrogen sensor when the distance between the smart key and the vehicle exceeds or is less than the first set value; and determining whether a hydrogen leak occurs in the vehicle, by the hydrogen sensor.

In an exemplary embodiment, the method may further include: in response to determining that a hydrogen leak occurs, displaying a hydrogen leak message by turning on a cluster and an emergency light when an amount of the leaking hydrogen is equal to or greater than a second set value before or after starting the vehicle. In addition, in response to determining that a hydrogen leak occurs, maintaining a starting-impossible state of the vehicle or shutting-down starting of the vehicle when an amount of the leaking hydrogen is equal to or greater than a third set value before or after starting the vehicle.

The method may further include: in response to determining that a hydrogen leak occurs, ventilating the leaking hydrogen through a ventilator operated in conjunction with the controller of the vehicle. The hydrogen sensor may include four sensors, and the four sensors may be disposed in the interior, an engine room, an engine room stack, and a hydrogen storage system of the vehicle, respectively. Additionally, in the detection of the hydrogen sensor, detection of the hydrogen sensor may be executed by a hydrogen storage control unit (HSCU).

The present invention provides a control method for a hydrogen leak determining system of a fuel cell vehicle, thereby providing a fuel cell vehicle capable of securing safety for a driver. The present invention includes a function of measuring a distance between a smart key and the fuel cell vehicle and warning the driver of a hydrogen leak, thereby providing a control method that allows the driver to recognize information regarding the hydrogen leak when the driver is distant to the vehicle at a predetermined distance (e.g., is at a predetermined distance from the vehicle). The present invention operates a ventilator interworking with the fuel cell vehicle according to a hydrogen leak, such that a driver may safely enter the vehicle even after a hydrogen leak occurs.

Moreover, the present invention uses a distance between the smart key and the fuel cell vehicle, to provide a control method, which may determine a hydrogen leak when a driver exits the vehicle and moves away from the vehicle and/or the driver approaches the vehicle, thereby determining whether a hydrogen leak occurs at least two times, to improve reliability for determining whether a hydrogen leak occurs.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
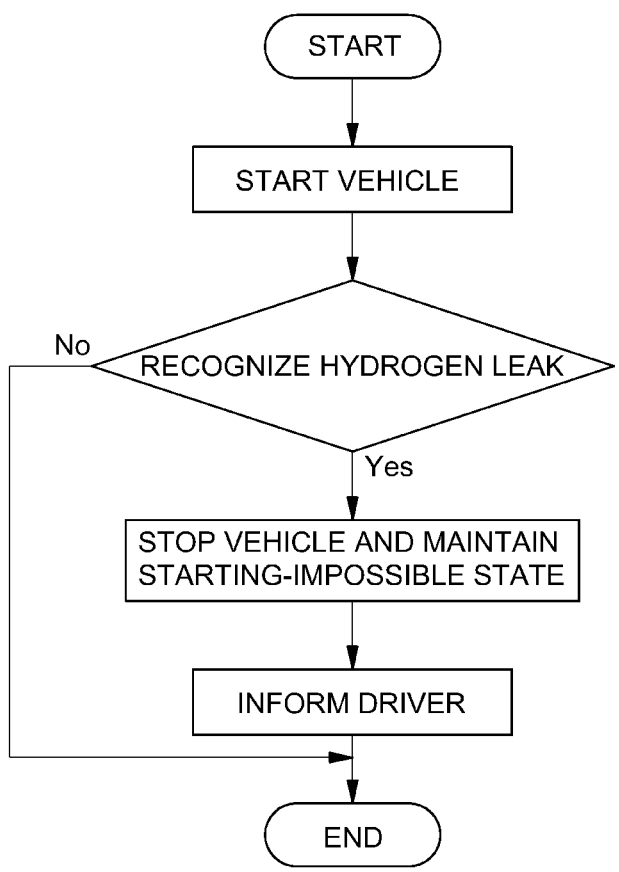
FIG. 1 illustrates a flowchart of a method of detecting a hydrogen leak when a fuel cell vehicle starts according to the related art.

Reference numerals set forth in the Drawings includes reference to the following elements as further discussed below:

10: fuel cell vehicle
20: hydrogen sensor
30: hydrogen storage control unit (HSCU)
40: hydrogen storage system It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be detected in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. Hereinafter, exemplary embodiments of the present invention will be described with reference to the accompanying drawings so that a person of ordinary skill in the art to which the present invention pertains may easily carry out the exemplary embodiments.

The present invention provides a control method for a hydrogen leak determining system of a fuel cell vehicle 10, thereby providing a fuel cell vehicle 10 capable of securing safety for a driver. Further, the present invention includes a function of measuring a distance between a smart key and the fuel cell vehicle 10 and warning a driver of a hydrogen leak, such that the driver may recognize information regarding the hydrogen leak when the driver is at a predetermined distance from the vehicle.

According to an exemplary embodiment of the present invention, when a hydrogen concentration equal to or greater than a predetermined concentration is measured due to a hydrogen leak, an air conditioner within a parking lot interworking with the vehicle may be operated to discharge the leaking hydrogen to the exterior of the parking lot. Therefore, a hydrogen concentration may be removed from a combustible area to secure safety of the fuel cell vehicle 10.

FIG. 1 illustrates a flowchart of a method of detecting a hydrogen leak in a fuel cell vehicle 10 to which the hydrogen leak determining system is applied according to the related art. To determine a hydrogen leak, according to the related art, power is applied to a hydrogen sensor by keying-on or starting a vehicle to detect whether a hydrogen leak occurs. The related art provides a control method which operates the vehicle to stop or disallow starting and warns a driver of a hydrogen leak.

However, since the hydrogen leak determination and control method according to the related art requires power applied to the vehicle to activate a hydrogen sensor, it is unreasonable to require keying-on or starting of the vehicle at the risk of leaking of hydrogen. The hydrogen leak determining system of the fuel cell vehicle 10 according to the present invention is mounted with a hydrogen storage system 40 configured to store high-pressure hydrogen gas used as a fuel of a stack.

The hydrogen storage system 40 may be formed of an inner liner layer made of a plastic material and an outer composite layer made of a carbon composite material. In particular, the hydrogen leak determining system may include a plurality of hydrogen sensors 20 configured to detect a hydrogen leak of the fuel cell vehicle 10. The hydrogen sensor 20 may generally be disposed within the vehicle, and according to the exemplary embodiment of the present invention, the fuel cell vehicle 10 may include the four hydrogen sensors 20, but is not limited thereto. The hydrogen leak determining system may include a hydrogen storage control unit (HSCU) 30 (e.g., a controller) configured to operate the hydrogen storage system 40. The hydrogen storage system 40 may be configured to open and close a hydrogen valve, and further, to receive a hydrogen amount measured by the hydrogen sensor 20 and compare the received hydrogen amount with a pre-stored set value.

Figure 2:
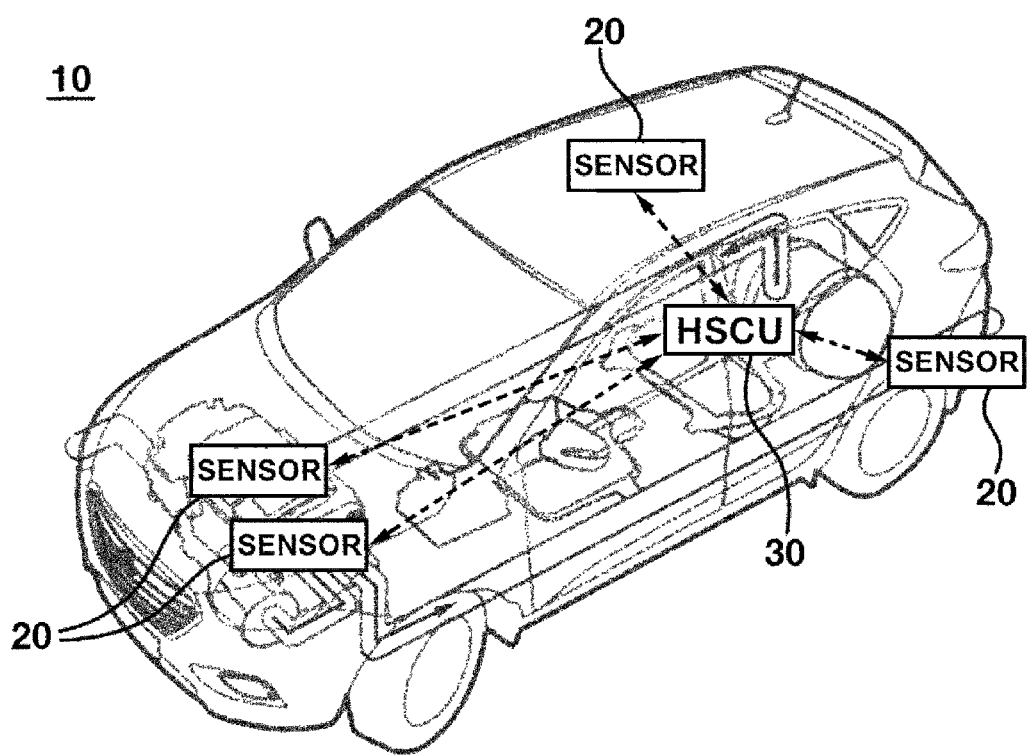
FIG. 2 is a configuration diagram illustrating a connection relationship between four hydrogen sensors disposed within a fuel cell vehicle and a hydrogen storage control unit (HSCU) according to an exemplary embodiment of the present invention.

FIG. 2 illustrates a configuration of the fuel cell vehicle 10 according to the present invention and positions at which a plurality of sensors may be mounted. For the hydrogen sensor 20, at least one hydrogen sensor 20 may be disposed within the vehicle, and more preferably, the four hydrogen sensors 20 may be disposed therein. According to an exemplary embodiment of the present invention, the four hydrogen sensors 20 may be disposed in the interior, an engine room, and an engine room stack of the vehicle, and above the hydrogen storage system 40, respectively. The hydrogen sensor 20 may be configured to transmit data regarding the measured hydrogen concentration to a controller. The controller may be generally a central processing unit, and more preferably, may be configured by the HSCU 30 and a hydrogen sensor 20 detection controller.

The controller may be configured to collect data of the measured hydrogen concentration and compare the collected hydrogen concentration data with a pre-stored set value. In addition, the controller may be configured to calculate a distance between a smart key and a vehicle and perform a key-on when the smart key approaches the vehicle within a predetermined distance or the smart key moves out of the predetermined distance (e.g., moves beyond a particular distance range) through a stored logic.

As described above, when the key-on of the vehicle is performed, power may be applied to the hydrogen sensor 20 and the controller, such that a logic of measuring whether a hydrogen leak occurs and comparing the set value, which may be previously set in the controller, and the measured hydrogen concentration may be executed. The controller may interwork with an air conditioner and a ventilation system disposed in an external parking lot. Therefore, the controller may be configured to operate the air conditioner within the parking lot or perform an operation necessary for internal ventilation based on whether a hydrogen leak occurs.

Figure 3:
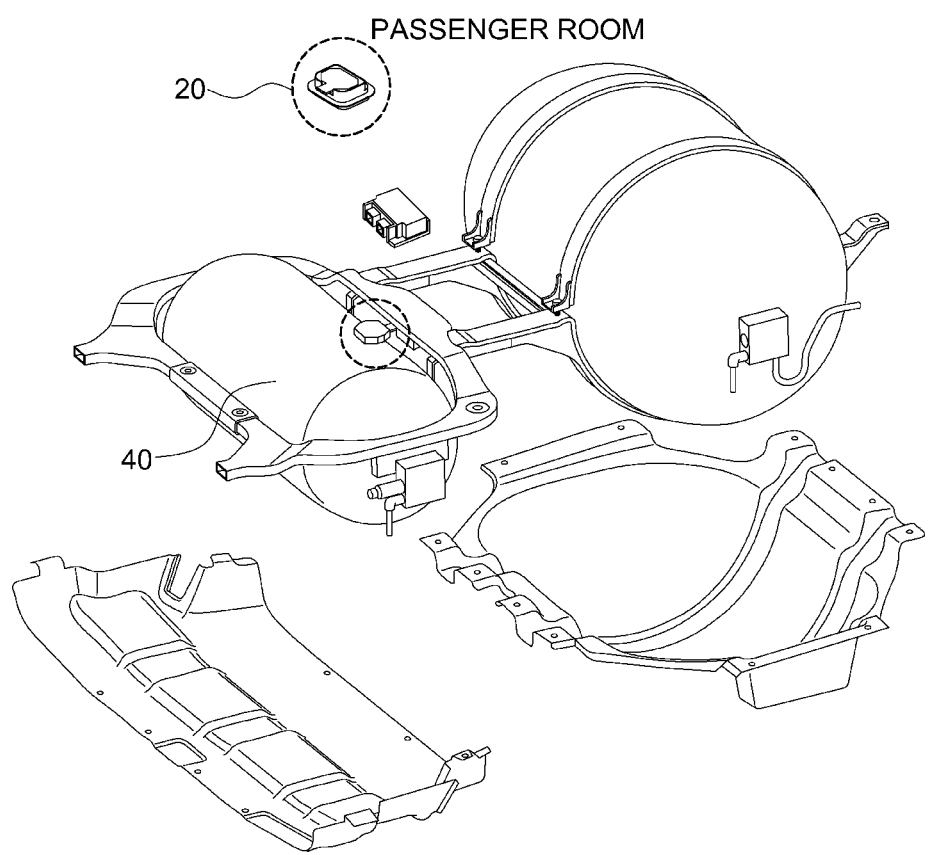
FIG. 3 illustrates a configuration of a hydrogen storage system and a position of a hydrogen sensor, and a hydrogen tank according to an exemplary embodiment of the present invention.

FIG. 3 illustrates a configuration of a sensor disposed in the hydrogen storage system 40 according to an exemplary embodiment the present invention. In general, when a hydrogen leak is detected, the hydrogen sensor 20 may be disposed above the hydrogen storage system 40 maintaining a high hydrogen concentration. According to an exemplary embodiment of the present invention, the hydrogen leak determining system may further include the hydrogen sensor 20 disposed in the interior of the vehicle in addition to the hydrogen sensor positioned above the hydrogen storage system 40, and may include the hydrogen sensors 20 disposed inside an engine room and inside an engine room stack.

Figure 4:
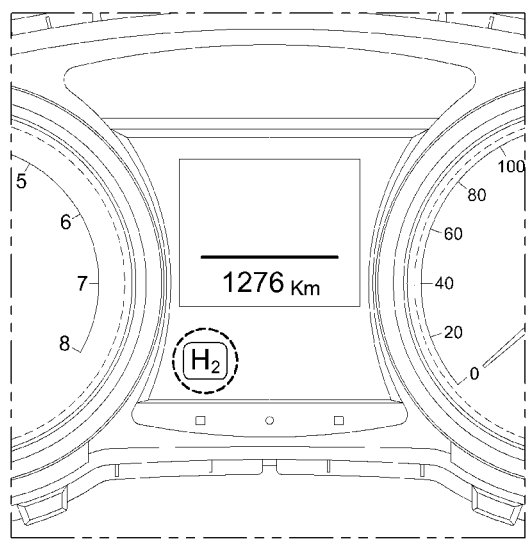
FIG. 4 illustrates a warning message displayed on a cluster of a vehicle when a hydrogen leak is detected according to an exemplary embodiment of the present invention.

FIG. 4 illustrates an exemplary embodiment to which the present invention is applied, in which when a hydrogen leak occurs in the fuel cell vehicle 10, a hydrogen leak warning message is displayed through a cluster positioned in a dashboard of the vehicle. In particular, a warning message may be displayed based on the hydrogen leak by turning on the cluster and an emergency light according to the hydrogen leak in the fuel cell vehicle 10. Further, when hydrogen in an amount equal to or greater than a third set value leaks, a starting-impossible state of the vehicle may be maintained or a starting shut-down operation of the vehicle may be performed by the controller.

Figure 5:
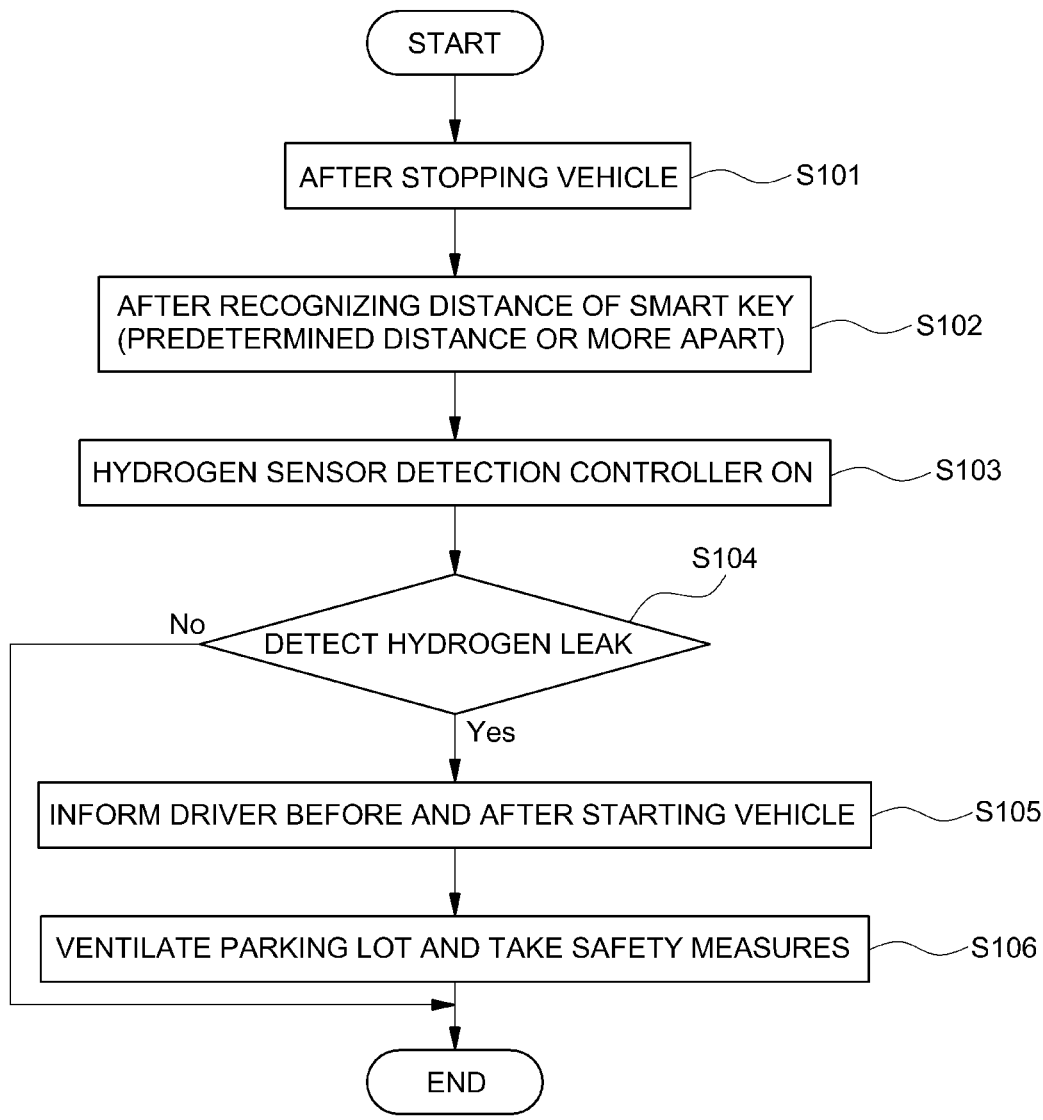
FIG. 5 illustrates a flowchart of a method of determining a hydrogen leak when a smart key is spaced apart from a vehicle at a predetermined distance according to an exemplary embodiment of the present invention.

FIG. 5 illustrates a flowchart of a control method for a hydrogen leak determining system of the fuel cell vehicle 10 according to the present invention. In the control method for a hydrogen leak determining system of the fuel cell vehicle 10 including the smart key, the control logic may be executed when the vehicle is parked or stops (S101). When a driver or a passenger moves far from (e.g., a predetermined distance) the vehicle while carrying the smart key (S102), the hydrogen sensor 20 detection controller may be operated (S103). In an exemplary embodiment of the present invention, power of about 12 V may be applied to the four hydrogen sensors 20 and the HSCU 30.

The logic by the controller may be implemented based on the measured distance between the smart key and the vehicle. The controller may be configured to measure the distance between the smart key and the vehicle in real time using short range communication between the smart key and the inside of the vehicle and thus may be configured to determine whether the distance exceeds the pre-stored first set value.

When the distance between the smart key and the vehicle is greater than the first set value stored in the controller, the hydrogen sensor 20 detection controller may be operated, and power may be supplied to a configuration for detecting a hydrogen concentration. In other words, the power may be supplied to the hydrogen sensor 20 and the HSCU 30. The hydrogen sensor 20 detection controller may be operated by the HSCU 30.

A hydrogen leak amount may be measured by at least one hydrogen sensor 20 disposed within the vehicle by operating the hydrogen sensor 20 detection controller (S104), and when the leaking hydrogen concentration is equal to or greater than a second set value, a user may be warned when the hydrogen leak occurs by at least one of the warning methods of displaying a hydrogen leak message via the cluster of the vehicle, turning on an emergency light, initiating a warning sound of the vehicle, and the like (S105).

The hydrogen leak amount may be measured and when the leaking hydrogen concentration is equal to or greater than the third set value, starting of the vehicle may be shut down or a starting-impossible state may be maintained in addition to using the methods of displaying the hydrogen leak message via the cluster of the vehicle, turning on the emergency light, initiating the warning sound of the vehicle, and the like. This operation may eliminate a risk of fire or explosion by hydrogen due to starting of the vehicle or connection of an electric device when a hydrogen leak occurs in a combustible area.

In addition, as described above, when a hydrogen leak is detected, ventilation may be performed by an air conditioning system driven in conjunction with the vehicle, to discharge hydrogen leaking to the inside of a single parking lot to the exterior before reaching the combustible area, thereby eliminating the risk of fire or explosion (S106). The air conditioning system may be configured to communicate with the controller of the vehicle and may include all air conditioning systems which may be connected to the vehicle.

Figure 6:
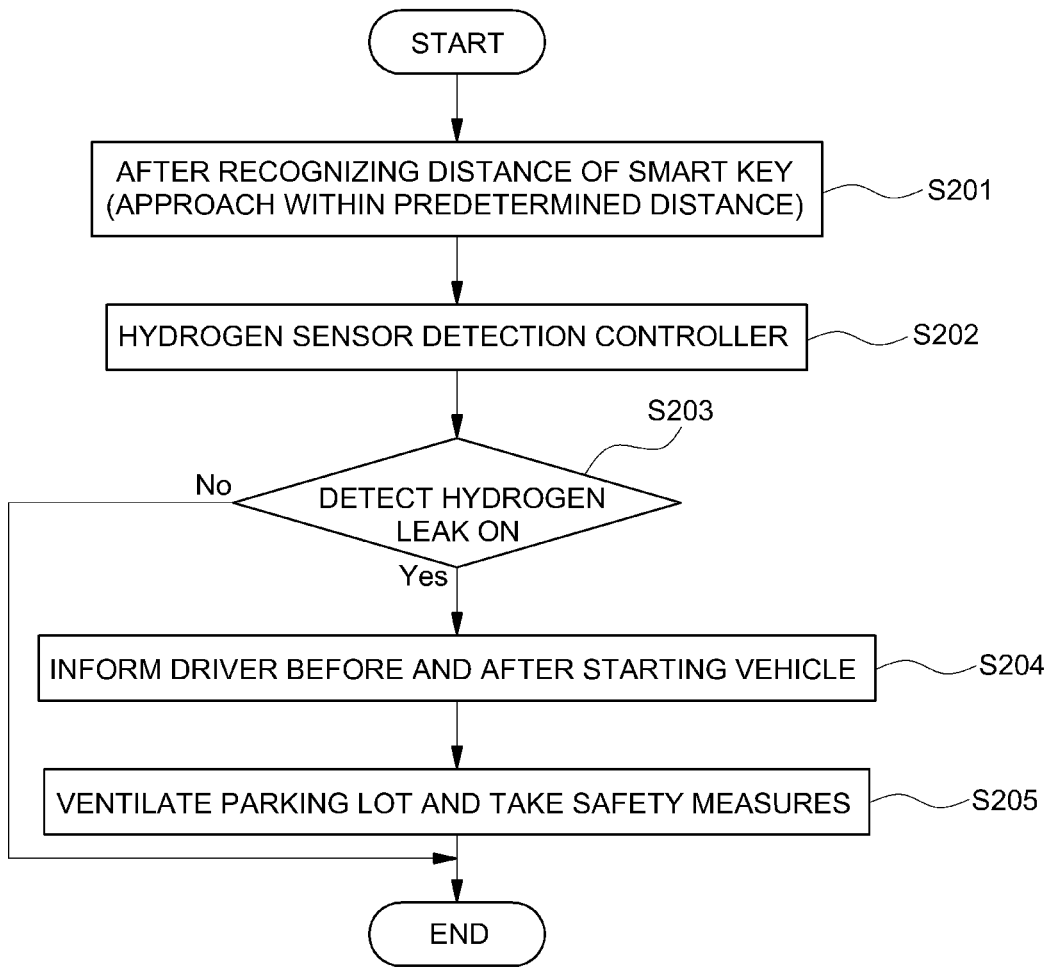
FIG. 6 illustrates a flowchart of a method of determining a hydrogen leak when the smart key approaches the vehicle within the predetermined distance according to an exemplary embodiment of the present invention.

FIG. 6 illustrates a flowchart of a method of determining a hydrogen leak, when the smart key approaches the vehicle within the distance of the first set value. When the smart key, which maintains a distance from the vehicle equal to or greater than the first set value, approaches (e.g., is brought closer to) the vehicle within the first set value (S201), the hydrogen sensor 20 detection controller may be operated (S202). To operate the hydrogen sensor 20 detection controller, a power source disposed inside the vehicle may be connected and configured to supply power to the hydrogen sensor, the HSCU 30, and the like. Then, the hydrogen leak may be detected (S203). In particular, a measurement value measured by the hydrogen sensor may be transmitted to the controller, and compared with the predetermined value in the controller to determine whether a hydrogen leak occurs.

When the leaking hydrogen concentration is equal to or greater than the second set value, a user may be warned when the hydrogen leak occurs by at least one of the warning methods of displaying a hydrogen leak message via the cluster of the vehicle, turning on the emergency light, initiating a warning sound of the vehicle, and the like (S204). A hydrogen leak amount may be measured and when the leaking hydrogen concentration is equal to or greater than the third set value, starting of the vehicle may be shut down or a starting-impossible state may be maintained in addition to using the methods of displaying a hydrogen leak message via the cluster of the vehicle, turning on the emergency light, initiating a warning sound of the vehicle, and the like.

This operation may ensure safety measures for eliminating a risk of fire or explosion by hydrogen due to starting of the vehicle or connection of an electric device when a hydrogen leak occurs in a combustible area. In addition, as described above, when a hydrogen leak is detected, ventilation may be performed by the air conditioning system driven in conjunction with the vehicle, to discharge hydrogen leaking to the inside of a single parking lot to the exterior before reaching the combustible area, thereby eliminating the risk of fire or explosion (S205). The air conditioning system may be configured to communicate with the controller of the vehicle and may include all air conditioning systems which may be connected to the vehicle.

What is claimed is:

1. A control method for a hydrogen leak determining system of a fuel cell vehicle which includes a plurality of hydrogen sensors disposed within the vehicle and configured to detect a hydrogen leak, the control method comprising:
   receiving a hydrogen concentration measured by the hydrogen sensors, by a controller, and measuring a distance between the vehicle and a smart key,
   determining, by the controller, whether the distance between the smart key and the vehicle is greater than or approaches a first set value;
   executing, by the controller, detection of the hydrogen sensors when the distance between the smart key and the vehicle exceeds or approaches the first set value; and
   determining, by the controller, whether a hydrogen leak occurs in the vehicle, using the hydrogen sensors,
   wherein the controller is further configured to:
   ventilate leaking hydrogen through a ventilator in response to determining that the hydrogen leak occurs.

2. The control method of claim 1, further comprising:
   in response to determining that a hydrogen leak occurs, displaying, by the controller, a hydrogen leak message by turning on a cluster and an emergency light when an amount of the leaking hydrogen is equal to or greater than a second set value before or after starting the vehicle.

3. The control method of claim 1, further comprising:
   in response to determining that a hydrogen leak occurs, maintaining, by the controller, a starting-impossible state of the vehicle or shutting-down starting of the vehicle when an amount of the leaking hydrogen is equal to or greater than a third set value before or after starting the vehicle.

4. The control method of claim 1, wherein the hydrogen sensors include four sensors, and the four sensors are disposed in the interior, an engine room, an engine room stack, and a hydrogen storage system of the vehicle, respectively.

5. The control method of claim 1, wherein the detection of the hydrogen sensors is executed by a hydrogen storage control unit (HSCU).

6. A hydrogen leak determining system of a fuel cell vehicle, comprising:
   a plurality of hydrogen sensors disposed within the vehicle and configured to detect a hydrogen leak; and
   a controller configured to receive a hydrogen concentration measured by the hydrogen sensor and measure a distance between the vehicle and a smart key,
   wherein the controller is further configured to:
   determine whether the distance between the smart key and the vehicle is greater than or approaches a first set value;
   execute detection of the hydrogen sensor when the distance between the smart key and the vehicle exceeds or approaches the first set value;
   determine whether a hydrogen leak occurs in the vehicle, using the hydrogen sensor; and ventilate leaking hydrogen through a ventilator in response to determining that the hydrogen leak occurs.

7. The system of claim 6, wherein the controller is further configured to:
  display a hydrogen leak message by turning on a cluster and an emergency light when an amount of the leaking hydrogen is equal to or greater than a second set value before or after starting the vehicle in response to determining that a hydrogen leak occurs.

8. The system of claim 6, wherein the controller is further configured to:
  maintain a starting-impossible state of the vehicle or shutting-down starting of the vehicle when an amount of the leaking hydrogen is equal to or greater than a third set value before or after starting the vehicle in response to determining that a hydrogen leak occurs.

9. The system of claim 6, wherein the hydrogen sensors include four sensors, and the four sensors are disposed in the interior, an engine room, an engine room stack, and a hydrogen storage system of the vehicle, respectively.

* * * * *